United States Patent
Iino et al.

(10) Patent No.: US 10,968,954 B2
(45) Date of Patent: Apr. 6, 2021

(54) GREASE, ANTIFRICTION BEARING, ANTIFRICTION BEARING DEVICE, AND INFORMATION RECORDING/REPRODUCING DEVICE

(71) Applicant: SEIKO INSTRUMENTS INC., Chiba (JP)

(72) Inventors: Akihiro Iino, Chiba (JP); Takayuki Kosaka, Chiba (JP); Misato Hanaoka, Chiba (JP); Hisaya Nakamura, Sodegaura (JP); Koji Ishii, Sodegaura (JP)

(73) Assignee: SEIKO INSTRUMENTS INC.

( * ) Notice: Subject to any disclaimer, the term of this patent is extended or adjusted under 35 U.S.C. 154(b) by 122 days.

(21) Appl. No.: 15/640,955

(22) Filed: Jul. 3, 2017

(65) Prior Publication Data

US 2018/0010642 A1 Jan. 11, 2018

(30) Foreign Application Priority Data

Jul. 11, 2016 (JP) .............................. JP2016-137028

(51) Int. Cl.
*F16C 33/66* (2006.01)
*C10M 169/02* (2006.01)
(Continued)

(52) U.S. Cl.
CPC ....... *F16C 33/6633* (2013.01); *C10M 101/02* (2013.01); *C10M 105/04* (2013.01);
(Continued)

(58) Field of Classification Search
CPC .............. F16C 33/6633; F16C 2370/12; F16C 2210/04; F16C 33/6688; F16C 33/416;
(Continued)

(56) References Cited

U.S. PATENT DOCUMENTS 4,749,502 A * 6/1988 Alexander ........... C10M 169/02
508/539
2003/0158052 A1* 8/2003 Akiyama ............. C10M 169/06
508/363
(Continued)

FOREIGN PATENT DOCUMENTS

CN 101107347 A 1/2008
CN 102112590 A 6/2011
(Continued)

OTHER PUBLICATIONS https://www.widman.biz/English/Calculators/Mixtures.html (available online May 1, 2010) (Year: 2010).*

(Continued)

Primary Examiner — Pamela H Weiss
(74) Attorney, Agent, or Firm — Adams & Wilks (57) ABSTRACT

A bearing grease includes a base oil and a thickener, and the base oil includes mineral oil and poly-α-olefin. The poly-α-olefin may be a blend of poly-α-olefin having a kinetic viscosity higher than that of the mineral oil and poly-α-olefin having a kinetic viscosity equal to or lower than that of the mineral oil, and the kinetic viscosity of the base oil at 40° C. is in a range of 40 through 90 mm²/s. The amount of the poly-α-olefin by mass in the base oil is greater than the amount of the mineral oil by mass in the base oil. The worked penetration of the grease is in a range of 200 through 250. The grease reduces flying grease and outgas and has superior low-temperature characteristics.

10 Claims, 6 Drawing Sheets (51) Int. Cl.

| | | |
|---|---|---|
| *F16C 33/41* | (2006.01) | |
| *C10M 101/02* | (2006.01) | |
| *C10M 105/04* | (2006.01) | |
| *F16C 19/54* | (2006.01) | |
| *C10N 20/02* | (2006.01) | |
| *C10N 30/02* | (2006.01) | |
| *C10N 30/06* | (2006.01) | |
| *C10N 40/02* | (2006.01) | |
| *C10N 50/10* | (2006.01) | |
| *C10M 115/08* | (2006.01) | |
| *G11B 5/48* | (2006.01) | |

(52) U.S. Cl.
CPC ........ *C10M 115/08* (2013.01); *C10M 169/02* (2013.01); *F16C 19/546* (2013.01); *F16C 33/416* (2013.01); *F16C 33/418* (2013.01); *F16C 33/6614* (2013.01); *F16C 33/6688* (2013.01); *G11B 5/4813* (2013.01); *C10M 2203/024* (2013.01); *C10M 2203/1006* (2013.01); *C10M 2203/1025* (2013.01); *C10M 2205/0285* (2013.01); *C10M 2215/1026* (2013.01); *C10N 2020/02* (2013.01); *C10N 2030/02* (2013.01); *C10N 2030/06* (2013.01); *C10N 2040/02* (2013.01); *C10N 2050/10* (2013.01); *F16C 2210/04* (2013.01); *F16C 2370/12* (2013.01)

(58) Field of Classification Search
CPC .. F16C 33/418; F16C 19/546; F16C 33/6614; G11B 5/4813; C10N 2220/022; C10N 2250/10; C10N 2230/02; C10N 2230/06; C10N 2240/02; C10N 2050/10; C10N 2030/06; C10N 2030/02; C10N 2020/02; C10N 2040/02; C10M 2205/0285; C10M 2203/1025; C10M 2203/024; C10M 115/08; C10M 169/02; C10M 105/04; C10M 101/02; C10M 2203/1006; C10M 2215/1026; C10M 2220/022
See application file for complete search history.

(56) References Cited

U.S. PATENT DOCUMENTS

| | | | | |
|---|---|---|---|---|
| 2009/0003742 A1* | 1/2009 | Nakatani | ............. | B60B 27/0005 384/289 |
| 2009/0062165 A1* | 3/2009 | Denis | ................... | C10M 169/06 508/172 |
| 2011/0136709 A1* | 6/2011 | Tanaka | ................. | C10M 169/06 508/144 |
| 2011/0160105 A1* | 6/2011 | Tanaka | ................. | C10M 129/40 508/144 |
| 2012/0196781 A1* | 8/2012 | Namiki | ................ | C10M 169/02 508/552 |
| 2014/0193110 A1* | 7/2014 | Soga | .................... | C10M 169/06 384/462 |
| 2016/0319213 A1* | 11/2016 | Iino | ..................... | F16C 33/6633 |

FOREIGN PATENT DOCUMENTS

| | | |
|---|---|---|
| CN | 102549127 A | 7/2012 |
| CN | 103097504 | 5/2013 |
| CN | 103097504 A | 5/2013 |
| CN | 103807304 A | 5/2014 |
| CN | 103814119 A | 5/2014 |
| JP | H059489 A | 1/1991 |
| JP | 04 139298 | 5/1992 |
| JP | 05 009489 | 1/1993 |
| JP | 06 330070 | 11/1994 |
| JP | 2002 146377 | 5/2002 |
| JP | 2002146377 A | 5/2002 |
| JP | 2003 239954 | 8/2003 |
| JP | 2003239954 A | 8/2003 |
| JP | 2004 092722 | 3/2004 |
| JP | 200409722 A | 3/2004 |
| JP | 2005537383 | 12/2005 |
| JP | 2011506680 | 3/2011 |
| JP | 2013 174334 | 9/2013 |
| JP | 2014 095397 | 5/2014 |
| JP | 2015 014332 | 1/2015 |
| JP | 2015 172153 | 10/2015 |
| JP | 2015172153 A | 10/2015 |
| WO | 2009062165 A1 | 3/2009 |

OTHER PUBLICATIONS

Japanese Office Action dated Mar. 17, 2020 in Japanese Patent Application No. 2016-137028.

Japanese Decision of Rejection dated Oct. 27, 2020 in Japanese Patent Application No. 2016-137028 together with English-language machine translation thereof.

Chinese Office Action dated Feb. 3, 2021 in Chinese Application No. 201710552258.6 together with English-language abstract.

* cited by examiner

GREASE, ANTIFRICTION BEARING, ANTIFRICTION BEARING DEVICE, AND INFORMATION RECORDING/REPRODUCING DEVICE

BACKGROUND OF THE INVENTION

Field of the Invention

The present invention relates to grease, an antifriction bearing, an antifriction bearing device, and an information recording/reproducing device.

Background Art

As a device for magnetically or optically recording a variety of types of information on a disk and reproducing the information therefrom, there has been known an information recording/reproducing device such as a hard disk drive (HDD). The information recording/reproducing device is generally provided with a swing arm, an antifriction bearing device, and an actuator, wherein a head-gimbal assembly (a magnetic head) for recording/reproducing a signal to/from the disk is disposed at the tip of the swing arm, the antifriction bearing device functions as a pivot of the swing arm, and the actuator rotates the swing arm. By rotating the swing arm to move the magnetic head to a predetermined position of the disk, recording and reproduction of the signal can be performed.

The antifriction bearing device is generally provided with a pair of antifriction bearings and a shaft, wherein a plurality of spherical rolling elements is disposed between an inner race and an outer race of each of the antifriction bearings, and the shaft is inserted inside the antifriction bearings. Due to the rolling motion of the plurality of rolling elements, the outer ring rotates around the shaft, and accordingly, the swing arm connected to the outer ring rotates. In the antifriction bearings, since it is required to stably operate for a long period of time, there is used grease for the purpose of smoothing the motion of the rolling elements between the inner race and the outer race.

The grease for the antifriction bearing of the information recording/reproducing device is required to be able to decrease the torque of the antifriction bearing, obtain excellent torque flatness (a property that the torque is uniform in the rotational direction of the antifriction bearing), and further, improve the durability of the antifriction bearing. Further, if the grease flying as a mist or an outgas from the grease is accumulated in a gap between the magnetic head and the disk and so on, a trouble occurs in reading and writing in the information recording/reproducing device. Therefore, it is important for the grease used for the antifriction bearing that an amount of the flying grease and an amount of the outgas are small.

As the grease for the antifriction bearing of the information recording/reproducing device, there is known, for example, the grease including base oil including mineral oil and poly-α-olefin (hereinafter described as "PAO"), a thickener (e.g., an urea compound), and an extreme-pressure agent (e.g., an organophosphorous compound) (JP-A-2003-239954). The grease is relatively small in an amount of outgas, and is capable of making the antifriction bearing low in torque, superior in torque flatness, and superior in durability. However, in recent years, due to an increase in density of the HDD and an increase in demand of a server usage, the distance between the disk and the magnetic head has become as precise as a nano-order level. Therefore, a further decrease in an amount of outgas is required.

As the grease capable of reducing the outgas, there has been proposed the grease for the antifriction bearing using only the PAO as the base oil without using the mineral oil larger in an amount of the outgas compared to the PAO (JP-A-2013-174334). However, according to the grease, although the amount of the outgas can be reduced, it is difficult to obtain an antifriction bearing having sufficient durability.

SUMMARY OF THE INVENTION

The invention has an object of providing grease reduced in an amount of the flying grease and an amount of the outgas, and superior in low-temperature characteristic, an antifriction bearing using the grease, an antifriction bearing device, and an information recording/reproducing device.

A grease according to an aspect of the invention includes a base oil, and a thickener, the base oil includes mineral oil and PAO, the PAO is higher in mass than the mineral oil, the PAO includes PAO higher in kinetic viscosity than the mineral oil, the kinetic viscosity of the base oil at 40° C. is in a range of 40 through 90 mm$^2$/s, and worked penetration is in a range of 200 through 250.

In the grease according to the aspect of the invention, it is preferable that a proportion of the mass of the mineral oil to a gross mass of the base oil is in a range of 10 through 40 mass %.

It is preferable that the mineral oil includes refined oil classified into group III in a base oil category defined by American Petroleum Institute.

It is preferable that the PAO higher in kinetic viscosity than the mineral oil includes a mixture of a multimeric complex (multimer) of α-olefin with a carbon number in a range of 8 through 12.

It is preferable that the PAO further includes PAO equal in kinetic viscosity to or lower in kinetic viscosity than the mineral oil.

It is preferable that the PAO lower in kinetic viscosity than the mineral oil includes a mixture of a multimeric complex (multimer) of α-olefin with a carbon number in a range of 8 through 12.

An antifriction bearing according to another aspect of the invention includes the grease according to the above aspect of the invention.

In the antifriction bearing according to the above aspect of the invention, it is preferable that there is further included a retainer having a ball pocket in which a rolling element is disposed, and the grease is kept in a part other than the ball pocket on the retainer.

An antifriction bearing device according to another aspect of the invention includes a shaft, and the antifriction bearing according to the above aspect of the invention.

An information recording/reproducing device according to another aspect of the invention includes the antifriction bearing device according to the above aspect of the invention.

The grease according to the above aspect of the invention is reduced in an amount of the flying grease and an amount of the outgas, and is superior in low-temperature characteristic.

The antifriction bearing, the antifriction bearing device, and the information recording/reproducing device according to the aspects of the invention are reduced in an amount of the flying grease and an amount of the outgas, and stably operate even at low temperature.

DETAILED DESCRIPTION OF THE INVENTION

The kinetic viscosity in the invention denotes a value measured at 40° C. in conformity with JIS K2283.

[Grease]

The grease according to the invention includes base oil and a thickener.

(Base Oil)

The base oil includes mineral oil and PAO.

The PAO is low in affinity for the thickener and an additive agent, and if the PAO is used alone as the base oil, it is difficult to uniformly disperse the thickener and the additive agent, and it is difficult to sufficiently obtain the effect of those agents. However, in the grease according to the invention, by using the mineral oil together with the PAO, the affinity of the base oil for the thickener and the additive agent becomes good. Thus, the variation in size of the thickener formed in the base oil is suppressed, and the size can also be miniaturized, and at the same time, the thickener is superior in dispersibility, and therefore, the torque flatness is excellent. Further, the effect of the additive agent is also exerted sufficiently.

<Mineral Oil>

As the mineral oil, known mineral oil used as the base oil can be used, and there can be cited, for example, naphthenic mineral oil, paraffinic mineral oil, hydrogenated mineral oil, solvent-refined mineral oil, and highly-refined mineral oil. As the mineral oil, it is possible to use a single species alone, or use two or more species in combination. For example, it is also possible to use one obtained by mixing a plurality of mineral oils different in kinetic viscosity from each other and then tuning the kinetic viscosity (average kinetic viscosity) into a target value.

As the mineral oil, it is preferable to adopt refined mineral oil classified into the group III (GrIII) in the API (American Petroleum Institute) base oil category from a viewpoint that there can be obtained the grease small in an amount of the outgas, superior in heat resistance, and also superior in low-temperature characteristic. As the refined mineral oil described above, there can be cited, for example, paraffinic mineral oil obtained by further highly-hydrorefining the lubricating oil distillate obtained by performing the atmospheric distillation on the crude oil. As the refined mineral oil classified into the group III described above, one having a flash point equal to or higher than 240° C. is preferable, and one having a flash point equal to or higher than 250° C. is more preferable. Such refined mineral oil is high in degree of refining, and thus, an amount of the outgas can further be reduced. As a reason therefor, it is assumed that the component low in molecular mass, which will cause the outgas, is reduced. Further, it is possible to suppress a rise in torque due to an increase in base oil viscosity at low temperature.

The kinetic viscosity $v_1$ of the mineral oil is preferably in a range of 40 through 80 mm$^2$/s, and is more preferably in a range of 45 through 60 mm$^2$/s. If the kinetic viscosity $v_1$ of the mineral oil is equal to or higher than the lower limit value described above, it is easy to reduce an amount of the outgas. If the kinetic viscosity $v_1$ of the mineral oil is equal to or lower than the upper limit value described above, the grease or the base oil becomes apt to be supplied to a surface, which requires the grease, in the rolling surface of the antifriction bearing.

It should be noted that in the case of using a mixture of a plurality of mineral oils different in kinetic viscosity from each other, the kinetic viscosity of the mixture is defined as the kinetic viscosity of the mineral oil.

<PAO>

The PAO in the grease according to the invention includes PAO (hereinafter also referred to as PAO (A)) higher in kinetic viscosity than the mineral oil. The mineral oil and the PAO (A) higher in kinetic viscosity than the mineral oil are combined with each other to thereby obtain the grease superior in low-temperature characteristic.

The kinetic viscosity of the PAO can be controlled by controlling, for example, the polymerization degree of α-olefin forming the PAO.

The kinetic viscosity $v_A$ of the PAO (A) is preferably in a range of 45 through 1800 mm$^2$/s, and is more preferably in a range of 50 through 650 mm$^2$/s. If the kinetic viscosity $v_A$ of the PAO (A) is equal to or higher than the lower limit value described above, it is easy to reduce an amount of the outgas. If the kinetic viscosity $v_A$ of the PAO (A) is equal to or lower than the upper limit value described above, the grease or the base oil becomes apt to be supplied to the surface, which requires the grease, in the rolling surface of the antifriction bearing when considering mixture with the mineral oil described above and PAO (B) described later.

It should be noted that in the case of using a mixture of a plurality of PAO different in kinetic viscosity from each other as the PAO (A), the kinetic viscosity of the mixture is defined as the kinetic viscosity of the PAO (A).

The ratio $v_1/v_A$ of the kinetic viscosity $v_1$ of the mineral oil to the kinetic viscosity $v_A$ of the PAO(A) is preferably in a range of 1.0 through 45, and is more preferably in a range of 10 through 20. If the ratio $v_1/v_A$ is equal to or higher than the lower limit value described above, it is easy to reduce an amount of the outgas. If the ratio $v_1/v_A$ is equal to or lower than the upper limit value described above, it is possible to ensure an excellent low-temperature characteristic.

The α-olefin for forming the PAO (A) is not particularly limited, and there can be cited, for example, 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicocene, and 1-dococene. The α-olefin for forming the PAO (A) can be a single species, or can also be two or more species.

As the PAO(A), it is possible to use a single species alone, or use a mixture of two or more species. As the PAO(A), it is preferable to include a mixture of a multimeric complex (multimer) of the α-olefin with the carbon number in a range of 8 through 12 having a kinetic viscosity $v_A$ raised to be higher than the kinetic viscosity $v_1$ of the mineral oil, and it is more preferable to include trimer through pentamer of the α-olefin with the carbon number in a range of 8 through 12. Thus, it is possible to further reduce an amount of the outgas and an amount of the flying grease, and it becomes easy to ensure an excellent low-temperature characteristic, and at the same time, it becomes easy to ensure high durability.

It is preferable for the PAO in the grease according to the invention to further include PAO (hereinafter also referred to as PAO (B)) having a kinetic viscosity equal to or lower than that of the mineral oil in addition to the PAO(A).

The kinetic viscosity $v_B$ of the PAO(B) is preferably in a range of 20 through 80 mm$^2$/s, and is more preferably in a range of 30 through 70 mm$^2$/s. If the kinetic viscosity $v_B$ of the PAO(B) is equal to or higher than the lower limit value described above, it is easy to reduce an amount of the outgas. If the kinetic viscosity $v_B$ of the PAO (B) is equal to or lower than the upper limit value described above, the grease or the base oil becomes apt to be supplied to the surface, which requires the grease, in the rolling surface of the antifriction bearing.

It should be noted that in the case of using a mixture of a plurality of PAO different in kinetic viscosity from each other as the PAO (B), the kinetic viscosity of the mixture is defined as the kinetic viscosity of the PAO (B).

The ratio $v_1/v_B$ of the kinetic viscosity $v_1$ of the mineral oil to the kinetic viscosity $v_B$ of the PAO(B) is preferably in a range of 0.5 through 1.0, and is more preferably in a range of 0.5 through 0.7. If the ratio $v_1/v_B$ is equal to or higher than the lower limit value described above, it is easy to reduce an amount of the outgas. If the ratio $v_1/v_B$ is equal to or lower than the upper limit value described above, the grease or the base oil becomes apt to be supplied to the surface, which requires the grease, in the rolling surface of the antifriction bearing.

The α-olefin for forming the PAO (B) is not particularly limited, and there can be cited, for example, the same as those cited as the α-olefin for forming the PAO (A). The α-olefin for forming the PAO(B) can be a single species, or can also be two or more species.

As the PAO(B), it is possible to use a single species alone, or use a mixture of two or more species. As the PAO(B), it is preferable to include a mixture of a multimeric complex (multimer) of the α-olefin with the carbon number in a range of 8 through 12 having a kinetic viscosity vD equal to or lower than the kinetic viscosity $v_1$ of the mineral oil, and it is more preferable to include trimer through pentamer of the αolefin with the carbon number in a range of 8 through 12. Thus, it is possible to further reduce an amount of the outgas and an amount of the flying grease, and it becomes easy to ensure an excellent low-temperature characteristic.

In the invention, from a viewpoint that an amount of the outgas and an amount of the flying grease can further be reduced, and the excellent low-temperature characteristic is easily ensured, the kinetic viscosity $v_2$ of the PAO is preferably higher than the kinetic viscosity $v_1$ of the mineral oil. It should be noted that the kinetic viscosity $v_2$ of the PAO denotes the kinetic viscosity of the whole of the PAO. In the case of using the PAO(A) alone as the PAO, the kinetic viscosity $v_2$ is equal to the kinetic viscosity $v_A$. In the case of using the PAO(A) and the PAO (B) as the PAO, the kinetic viscosity $v_2$ can roughly be estimated as a mass-average value of the kinetic viscosity $v_A$ and the kinetic viscosity $v_B$.

The kinetic viscosity $v_2$ of the PAO is preferably in a range of 45 through 200 mm$^2$/s, and is more preferably in a range of 50 through 120 mm$^2$/s. If the kinetic viscosity $v_2$ of the PAO is equal to or higher than the lower limit value described above, it is easy to reduce an amount of the outgas. If the kinetic viscosity $v_2$ of the PAO is equal to or lower than the upper limit value described above, it is easy to suppress a rise in torque at low temperature.

The ratio $v_1/v_2$ of the kinetic viscosity $v_1$ of the mineral oil to the kinetic viscosity $v_2$ of the PAO is preferably in a range of 0.5 through 2.0, and is more preferably in a range of 0.5 through 1.0. If the ratio $v_1/v_2$ is equal to or higher than the lower limit value described above, it is easy to reduce an amount of the outgas. If the ratio $v_1/v_2$ is equal to or lower than the upper limit value described above, it is easy to suppress a rise in torque at low temperature.

<Other Oil Components>

The base oil can include other oil components than the mineral oil and the PAO in addition to the mineral oil and the PAO. As other oil components, there can be cited, for example, a synthetic oil such as an ester oil. As other oil components, it is possible to use a single species alone, or use two or more species in combination.

The kinetic viscosity $v$ of the base oil is in a range of 40 through 90 mm$^2$/s, and is preferably in a range of 55 through 90 mm$^2$/s, and is more preferably in a range of 65 through 90 mm$^2$/s. If the kinetic viscosity $v$ of the base oil is equal to or higher than the lower limit value described above, it is easy to reduce an amount of the outgas. If the kinetic viscosity $v$ of the base oil is equal to or lower than the upper limit value described above, the grease or the base oil is apt to be supplied to the surface, which requires the grease, in the rolling surface or the like of the antifriction bearing. Further, since it is superior in low-temperature characteristic, the action can be achieved with low torque even in the application (e.g., an in-car application for which a stable action is required at the temperature as low as −30° C.) for which a stable action at low temperature is required.

(Thickener)

The thickener has a role of keeping the grease in a semi-solid state.

As the thickener, a known thickener ordinarily used as the grease can be used without limitation. As a specific example of the thickener, there can be cited, for example, an urea compound and a lithium soap. Among these, as the thickener, from a viewpoint of superiority in heat resistance, an urea compound is preferable, and a diurea compound having two urea bonds in one molecule is more preferable.

As the diurea compound, there can be cited, for example, an aliphatic diurea compound terminated with an aliphatic group, an alicyclic diurea compound terminated with an alicyclic group, and an aromatic diurea compound terminated with an aromatic group. As a specific example of the diurea compound, there can be cited, for example, a compound obtained by the reaction between diisocyanate (e.g., phenylene diisocyanate, tolylene diisocyanate) and monoamine (e.g., octylamine, dodecylamine, stearylamine, aniline, and p-toluidine).

As the lithium soap, there can be cited, for example, lithium stearate, and lithium 12-hydroxystearate.

As the thickener, it is possible to use a single species alone, or use two or more species in combination.

(Other Components)

The grease according to the invention can include other components than the base oil and the thickener as needed in addition to the base oil and the thickener. As other components, known components ordinarily used in the grease can be used, and there can be cited additive agents such as an extreme-pressure agent, an antioxidant, a rust inhibitor, an oiliness improver, and a metal deactivator.

As the extreme-pressure agent, there can be cited, for example, an organomolybdenum compound (e.g., molybdenum dithiocarbamate, molybdenum dithiophosphate), an organic fatty acid compound (e.g., oleic acid, naphthenic acid, succinic acid), an organophosphorous compound (e.g., trioctyl phosphate, triphenyl phosphate, triethyl phosphate), and ester phosphate. Further, as the extreme-pressure agent, it is also possible to use zinc dithiocarbamate, antimony dithiocarbamate, or the like.

As the extreme-pressure agent, it is possible to use a single species alone, or use two or more species in combination.

As the antioxidant, there can be cited, for example, a phenolic antioxidant (e.g., 2,6-Di-t-butyl-4-methylphnol), an amine antioxidant (e.g., p,p'-dioctyldiphenylamine). As the antioxidant, it is possible to use a single species alone, or use two or more species in combination. In the case in which the grease according to the invention includes the antioxidant, it is preferable to use the phenolic antioxidant and the amine antioxidant in combination. Further, in this case, it is preferable that the content of the amine antioxidant in the grease is higher than the content of the phenolic antioxidant.

As the rust inhibitor, there can be cited, for example, an alkali metal salt or an alkaline-earth metal salt of an organic sulfonic acid (e.g., potassium sulfonate, magnesium sulfonate, barium sulfonate), and a partial ester of a polyalcohol (e.g., sorbitan monooleate).

As the rust inhibitor, it is possible to use a single species alone, or use two or more species in combination.

(Proportion of Each Component)

The proportion of the mass of the base oil to the gross mass of the grease according to the invention is preferably in a range of 75 through 93 mass %, and is more preferably in a range of 80 through 90 mass %. If the proportion of the base oil is equal to or higher than the lower limit value described above, the grease or the base oil is apt to be supplied to the surface, which requires the grease, in the rolling surface or the like of the antifriction bearing. If the proportion of the base oil is equal to or lower than the upper limit value described above, the grease is in the semi-solid state, and is hard to leak and hard to fly.

The proportion of the mass of the mineral oil to the gross mass of the base oil is in a range of 10 through 40 mass %, and is preferably in a range of 20 through 30 mass %. If the proportion of the mineral oil is equal to or higher than the lower limit value described above, there can be obtained the grease achieving the balance between the superiority in durability and the torque flatness. If the proportion of the mineral oil is equal to or lower than the upper limit value described above, there can be obtained the grease sufficiently reduced in an amount of the outgas and an amount of the flying grease, and suppressed in a rise in torque at low temperature.

In the invention, the mass of the PAO is set higher than the mass of the mineral oil. Specifically, in the case of using the PAO(A) alone as the PAO, the mass of the PAO(A) is higher than the mass of the mineral oil, and in the case of using the PAO (A) and the PAO (B) as the PAO, the total mass of the PAO (A) and the PAO (B) is higher than the mass of the mineral oil.

The mass ratio (PAO/mineral oil) of the PAO to the mineral oil in the base oil is preferably in a range of 1.25 through 9, and is more preferably in a range of 1.5 through 4. If the mass ratio described above is equal to or higher than the lower limit value described above, the grease sufficiently reduced in an amount of the outgas and an amount of the flying grease is apt to be obtained. If the mass ratio described above is equal to or lower than the upper limit value descried above, the excellent durability and the torque flatness are apt to be obtained.

The proportion of the total mass of the PAO to the gross mass of the base oil is preferably in a range of 50 through 90 mass %, and is more preferably in a range of 60 through 80 mass %. If the proportion of the PAO is equal to or higher than the lower limit value described above, the grease sufficiently reduced in an amount of the outgas and an amount of the flying grease, and suppressed in a rise in torque at low temperature is apt to be obtained. If the proportion of the PAO is equal to or lower than the upper limit value described above, there can be obtained the grease achieving the balance between the superiority in durability and the torque flatness.

The proportion of the mass of the PAO(A) to the total mass of the PAO is preferably in a range of 20 through 100 mass %, and is more preferably in a range of 30 through 60 mass %. If the proportion of the PAO(A) is equal to or higher than the lower limit value described above, the grease sufficiently reduced in an amount of the outgas and an amount of the flying grease is apt to be obtained. If the proportion of the PAO (A) is equal to or lower than the upper limit value described above, the excellent durability and the torque flatness are apt to be obtained.

The proportion of the total mass of the mineral oil and the PAO to the gross mass of the base oil is preferably equal to or higher than 70 mass %, and is more preferably equal to or higher than 80 mass %, and is further more preferably equal to or higher than 90 mass %. If the proportion of the total mass of the mineral oil and the PAO is equal to or higher than the lower limit value described above, the grease low in torque at low temperature in particular not higher than 0° C. is apt to be obtained. The upper limit value of the ratio of the total mass of the mineral oil and the PAO described above is 100 mass %.

The proportion of the mass of the thickener to the gross mass of the grease according to the invention is preferably in a range of 7 through 20 mass %, and is more preferably in a range of 10 through 15 mass %. Thus, the worked penetration is adjusted in a range of 200 through 250, and more preferably in a range of 215 through 235. By setting such a worked penetration range, an amount of seepage of the base oil from the grease is limited to suppress fly during the operation, and the low torque is apt to be obtained even in the case in which the base oil high in viscosity is used. Further, if the proportion of the thickener is equal to or higher than the lower limit value described above, the grease is in the semi-solid state, and is hard to leak and hard to fly. If the proportion of the thickener is equal to or lower than the upper limit value described above, the grease or the base oil is apt to be supplied to the surface, which requires the grease, in the rolling surface or the like of the antifriction bearing.

The proportion of the mass of the extreme-pressure agent to the gross mass of the grease according to the invention is preferably in a range of 0.2 through 4 mass %, and is more preferably in a range of 0.5 through 2 mass %.

The proportion of the mass of the antioxidant to the gross mass of the grease according to the invention is preferably in a range of 0.05 through 4 mass %, and is more preferably in a range of 0.2 through 2 mass %.

The proportion of the mass of the rust inhibitor to the gross mass of the grease according to the invention is preferably in a range of 0.2 through 4 mass %, and is more preferably in a range of 0.5 through 2 mass %.

(Intended Purposes)

Regarding the intended purposes, the grease according to the invention is particularly useful as the grease used in the antifriction bearing in an information recording/reproducing device and electronic apparatus manufacturing equipment. As the electronic apparatus manufacturing equipment, there can be cited, for example, semiconductor manufacturing equipment, liquid crystal manufacturing equipment, and printed-circuit board manufacturing equipment. Further, the grease according to the invention can also be used as the grease to be encapsulated in a linear guide or a ball screw.

[Information Recording/Reproducing Device]

The antifriction bearing, the antifriction bearing device, and the information recording/reproducing device according to the invention can adopt a known configuration except for using the grease according to the invention. The description will hereinafter be presented showing an example of the antifriction bearing, the antifriction bearing device, and the information recording/reproducing device according to the invention.

Figure 1:
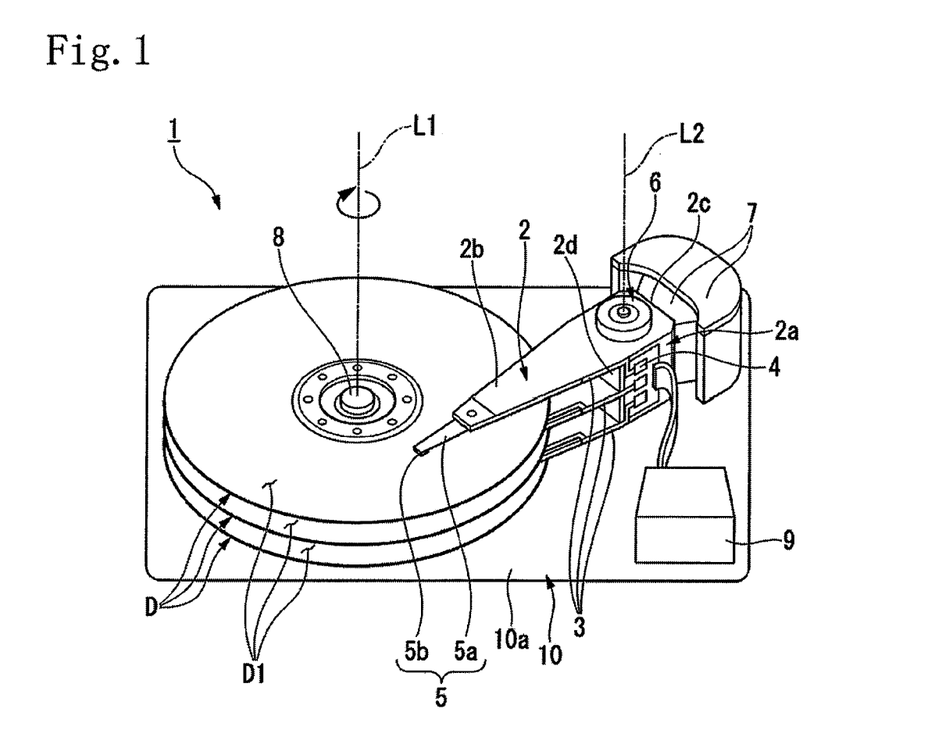
FIG. 1 is a perspective view showing an example of an information recording/reproducing device according to the invention.

The information recording/reproducing device 1 according to the present embodiment is a device for performing writing to a disk (a magnetic recording medium) D using the vertical recording method, and is provided with the disk D, a swing arm 2, optical waveguides 3, laser sources 4, head-gimbal assemblies (HGA) 5, an antifriction bearing device 6, an actuator 7, a spindle motor (a rotary drive section) 8, a control section 9, and a housing 10 as shown in FIG. 1.

The housing 10 is for housing the constituents in the information recording/reproducing device 1.

The housing 10 is provided with a bottom part 10a having a rectangular planar shape, a peripheral wall part (not shown) erected from the circumferential edge of the bottom part 10a, and a lid member (not shown) detachably fixed to the upper part of the peripheral wall part and for covering the opening part. The housing 10 is arranged to house the constituents inside the peripheral wall part on the bottom part 10a. In FIG. 1, the peripheral wall part and the lid member are omitted for the sake of convenience.

The material of the housing 10 is not particularly limited, and there can be cited a metal material such as aluminum.

The spindle motor 8 is attached to a rough center of the bottom part 10a of the housing 10. Further, the spindle motor 8 is fitted into a central hole formed at the center of the disk D, and thus, three disks D are detachably mounted. It is arranged that the spindle motor 8 can rotate the disks D in a certain direction around a rotational axis line L1.

The actuator 7 is attached to a corner part of the bottom part 10a of the housing 10 so as to be located outside the disks D. The swing arm 2 extending toward the disks D is connected to the actuator 7. In the part on the base side of the swing arm 2, there is disposed the antifriction bearing device 6. It is arranged that due to the drive by the actuator 7, the swing arm 2 rotates in a horizontal plane around the rotational axis line L2 of the antifriction bearing device 6.

The swing arm 2 is provided with a base part 2a connected to the actuator 7, and arm parts 2b disposed so as to extend from the base part 2a toward the disks D. The swing arm 2 can be obtained by, for example, integrally forming the base part 2a and the arm parts 2b using cutting work or the like.

The base part 2a has a roughly rectangular solid shape, and is rotatably supported by the antifriction bearing device 6 so as to surround the antifriction bearing device 6.

The arm parts 2b each have a plate-like shape, and each have a tapered shape tapering from the base part toward the tip part. The arm parts 2b are each disposed so as to extend from a front surface (a surface on the opposite side to the corner part) 2d, which is located on the opposite side to a back surface 2c attached with the actuator 7 in the base part 2a, in a plain direction of the upper surface of the base part 2a (a horizontal in-plane direction).

Further, in the swing arm 2 of this example, the three arm parts 2b are disposed in the height direction (a vertical direction) of the base part 2a so that the disks D are located between the respective arm parts 2b. Specifically, the arm parts 2b and the disks D are disposed so as to be alternately located in the height direction, and are arranged so that the arm parts 2b move in a direction parallel to the disk surfaces (surfaces of the disks D) D1 due to the drive by the actuator 7.

At the tip of each of the arm parts 2b in the swing arm 2, there is disposed the head-gimbal assembly 5. On the side surface part of the base part 2a of the swing arm 2, there are disposed laser sources 4. The base part 2a and the arm parts 2b of the swing arm 2 are provided with the optical waveguides 3 connecting the laser sources 4 and the head-gimbal assemblies 5 to each other. Thus, it is arranged that the light can be supplied from the laser sources 4 to the head-gimbal assemblies 5 via the optical waveguides 3.

The head-gimbal assemblies 5 are each provided with a suspension 5a and a slider 5b attached to the tip of the suspension 5a.

The slider 5b has a near-field light generation element. When the light is guided from the laser source 4 to the slider 5b, the near-field light generation element generates near-field light. By using the near-field light, a variety of types of information can be recorded on and reproduced from the disks D.

The near-field light generation element can be formed of, for example, an optical microscopic aperture or a projection formed to have a nanometer size.

Due to the drive by the actuator 7, the head-gimbal assemblies 5 move in a direction parallel to the disk surfaces D1 together with the arm parts 2b of the swing arm 2. It should be noted that it is arranged that the swing arm 2 and the head-gimbal assemblies 5 are retracted from the surfaces of the disks D due to the drive by the actuator 7 when the rotation of the disks D stops.

The control section 9 is connected to the laser sources 4. In the control section 9, it is arranged that the beam of the light supplied to the slider 5b of the head-gimbal assembly 5 can be controlled by the current modulated in accordance with the information.

(Antifriction Bearing Device)

Figure 2:
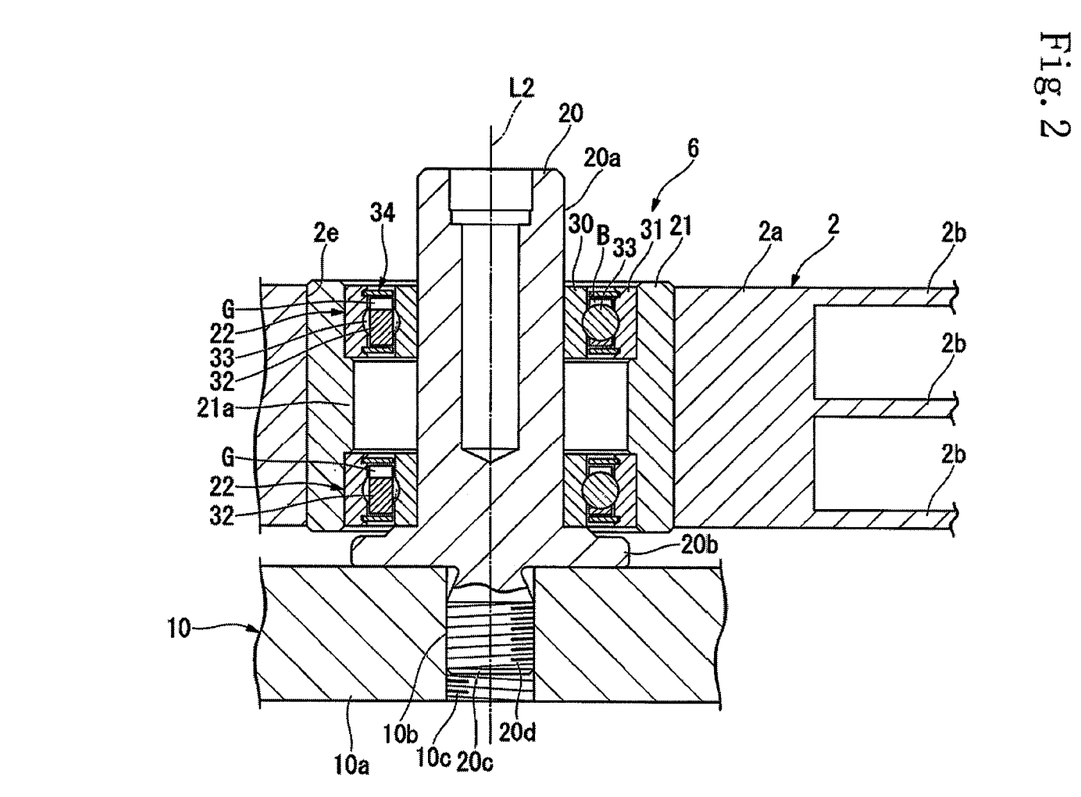
FIG. 2 is a vertical cross-sectional view showing the periphery of an antifriction bearing device in the information recording/reproducing device shown in FIG. 1.
Figure 3:
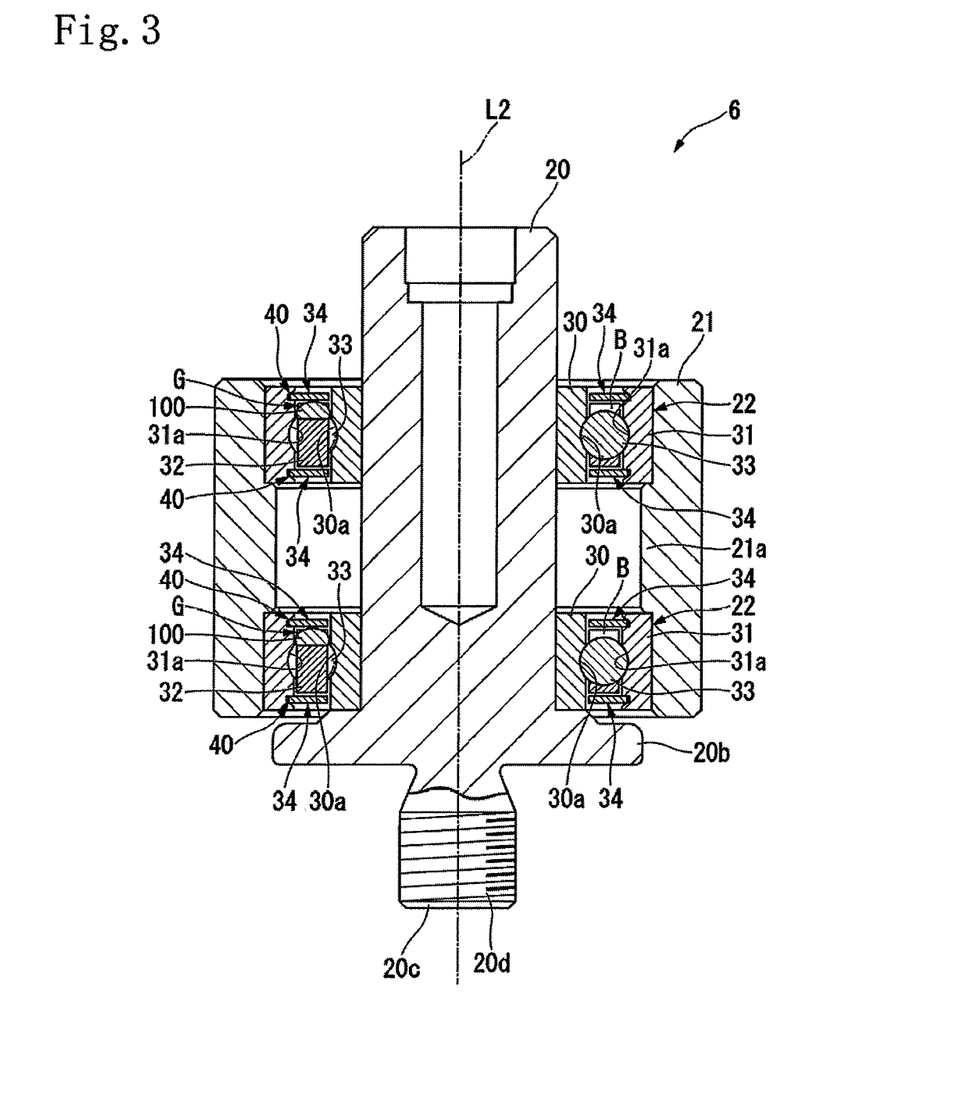
FIG. 3 is a vertical cross-sectional view showing the antifriction bearing device shown in FIG. 2.

As shown in FIG. 2 and FIG. 3, the antifriction bearing device 6 is provided with a shaft 20, a sleeve 21 disposed outside the shaft 20 coaxially with the shaft 20, and two antifriction bearings 22 disposed between the shaft 20 and the sleeve 21.

The shaft 20 is a rod-like member having a cylindrical shape, and is erected from the bottom part 10a of the housing 10. The central axis of the shaft 20 coincides with the rotational axis line L2 when the swing arm 2 rotates.

In a part of the shaft 20 located on the bottom 10a side of the housing 10, there are disposed a flange part 20b increased in diameter compared to the main body part 20a, and a reduced diameter part 20c reduced in diameter compared to the main body part 20a in sequence toward the base. On the outer circumferential surface of the reduced diameter part 20c, there is formed a male thread 20d. By inserting the reduced diameter part 20c of the shaft 20 into a hole 10b provided to the bottom part 10a of the housing 10, and then screwing a female screw 10c formed on the inner circumferential surface of the hole 10b and the male thread 20d of the reduced diameter part 20c with each other, the shaft 20 is erected on the bottom part 10a of the housing 10. On this occasion, by the lower surface of the flange part 20b having contact with the bottom part 10a of the housing 10, the positioning in the height direction of the shaft 20 is achieved.

The sleeve 21 is a member formed to have a cylindrical shape. The inner diameter of the sleeve 21 is set to be roughly the same diameter as the outer diameter of the flange part 20b.

The sleeve 21 is disposed so as to surround the shaft 20 from the outside in the radial direction, and so that the inner circumferential surface of the sleeve 21 is separated with a predetermined distance from the outer circumferential surface of the shaft 20. The central axis of the shaft 20 and the central axis of the sleeve 21 are arranged to coincide with each other.

Further, the sleeve 21 is directly pressed into an attachment hole 2e provided to the base part 2a of the swing arm 2, or pressed into the attachment hole 2e via an elastic body such as a metal ring formed to have a wavy shape, or bond fitted into the attachment hole 2e to thereby integrally be combined with the swing arm 2.

In a central part in the height direction in the inner circumferential surface of the sleeve 21, a spacer 21a protruding inward is formed in the circumferential direction throughout the entire circumference. Between the shaft 20 and the sleeve 21, the two antifriction bearings 22 are respectively disposed above and below the spacer 21a so that the distance between the two antifriction bearings 22 is kept in a predetermined distance.

(Antifriction Bearings)

The two antifriction bearings 22 provided to the antifriction bearing device 6 are identical to each other.

As shown in FIGS. 3 through 6, the antifriction bearings 22 are each provided with an inner ring 30, an outer ring 31, a retainer 32, a plurality of rolling elements 33, and two shield plates 34.

Figure 4:
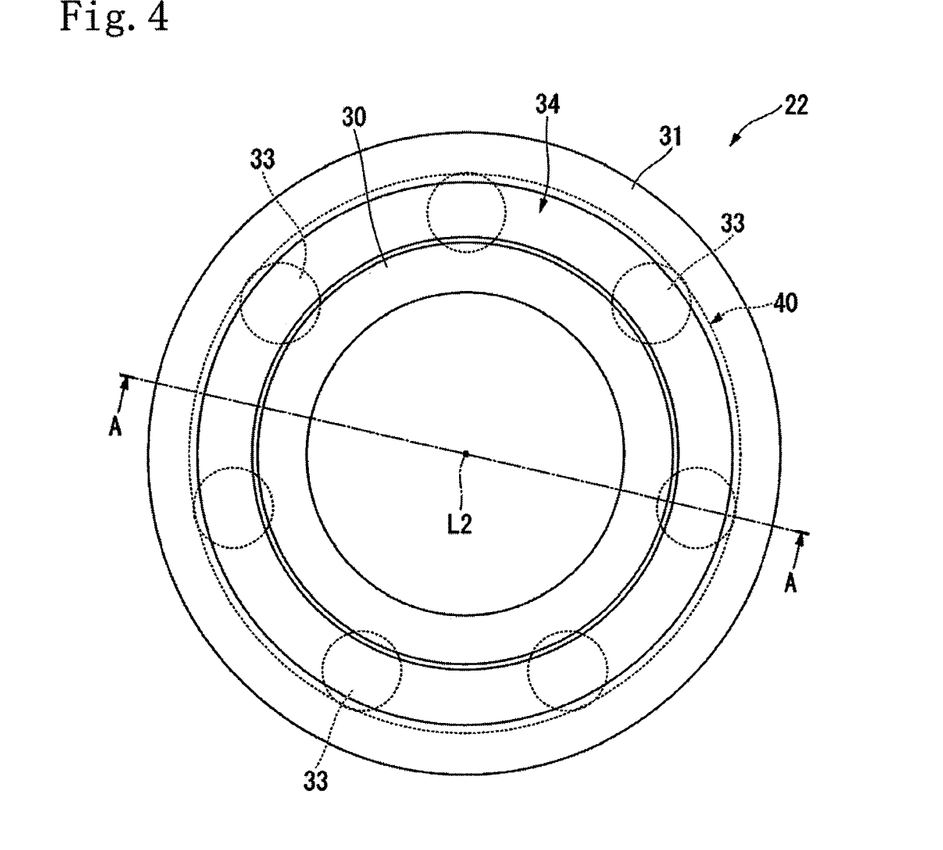
FIG. 4 is a plan view showing the antifriction bearing in the antifriction bearing device shown in FIG. 3.
Figure 5:
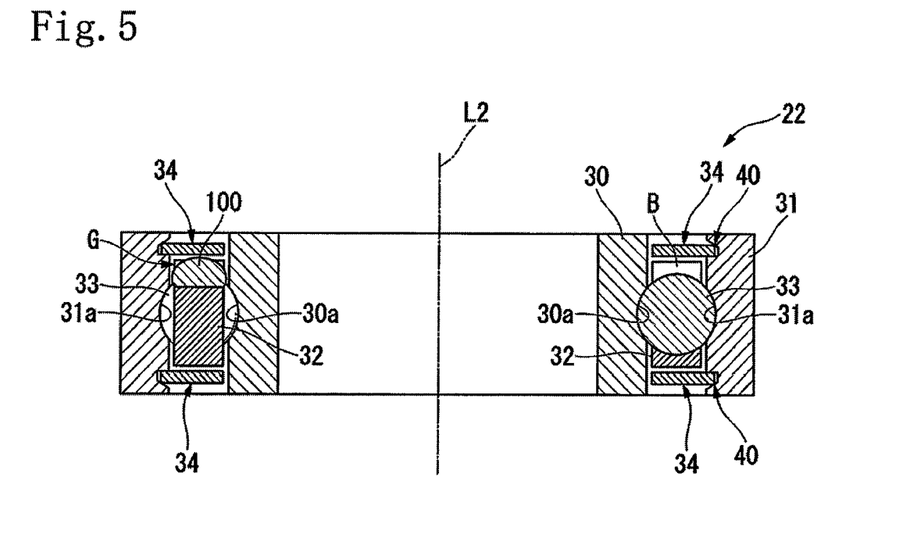
FIG. 5 is an A-A cross-sectional view of the antifriction bearing shown in FIG. 4.

The inner ring 30 is a cylindrical member.

The inner diameter of the inner ring 30 is set to a dimension with which the shaft 20 can be inserted. In the present embodiment, the inner diameter of the inner ring 30 is made slightly larger than the outer diameter of the shaft 20. The shaft 20 is inserted inside the inner ring 30, and the inner ring 30 is fixed to the shaft 20.

It should be noted that the inner diameter of the inner ring 30 can also be made the same as, or slightly smaller than the outer diameter of the shaft 20 within a range in which the inner ring 30 can be attached to the shaft 20. In this case, the shaft 20 is pressed into and fixed to the inner ring 30.

In the antifriction bearings 22, there can be adopted so-called inner ring preload for fixing the inner rings 30 to the shaft 20 in a state in which a preload is relatively applied to the inner rings 30 in the axial direction with respect to the shaft 20. Thus, the antifriction bearings 22 can be made high in stiffness, and the resonance frequency (resonance point) of the antifriction device 6 can be raised. Therefore, the antifriction bearing device 6 capable of dealing with a higher rotational speed can be obtained.

It should be noted that in the antifriction bearings 22, it is also possible to adopt so-called outer ring preload for fixing the outer rings 31 to the sleeve 21 in a state in which a preload is relatively applied to the outer rings 31 in the axial direction with respect to the shaft 20.

In an intermediate part in the axial direction in the outer circumferential surface of the inner ring 30, an inner ring rolling surface 30a having a recessed shape for guiding the rolling motion of the rolling elements 33 is formed throughout the entire circumference of the inner ring 30. In the inner ring rolling surface 30a, the cross-sectional shape obtained when cutting the inner ring 30 with a plane passing through the central axis of the inner ring 30 has an arc-like shape.

As the material of the inner ring 30, there can be cited a metal material such as stainless steel. The inner ring 30 can be manufactured using, for example, a forging process or a machining process.

The outer ring 31 is a cylindrical member similar to the inner ring 30, but larger in diameter than the inner ring 30.

The outer ring 31 is fixed to the inner side of the sleeve 21 to thereby be installed outside the inner ring 30 in a state of being separated from the inner ring 30. The inner ring 30 and the outer ring 31 are coaxially installed so that the central axes thereof both coincide with the central axis of the shaft 20.

In an intermediate part in the axial direction in the inner circumferential surface of the outer ring 31, an outer ring rolling surface 31a having a recessed shape for guiding the rolling motion of the rolling elements 33 is formed throughout the entire circumference of the outer ring 31 so as to be opposed to the inner ring rolling surface 30a. In the outer ring rolling surface 31a, the cross-sectional shape obtained when cutting the outer ring 31 with a plane passing through the central axis of the outer ring 31 has an arc-like shape.

As the material of the outer ring 31, there can be cited a metal material such as stainless steel. The outer ring 31 can be manufactured using, for example, a forging process or a machining process.

Figure 6:
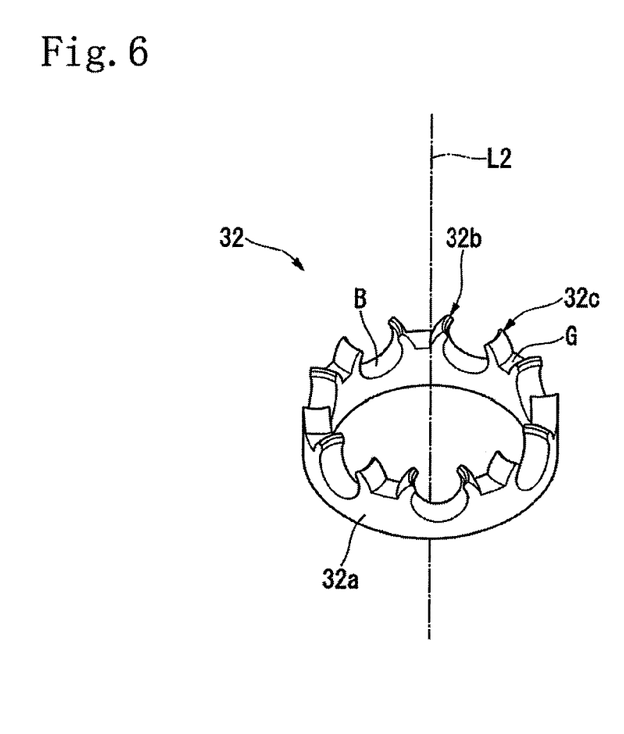
FIG. 6 is a perspective view showing a retainer of the antifriction bearing shown in FIG. 5.

As shown in FIG. 6, the retainer 32 is provided with a main body part 32a having an annular shape, and seven pairs of stop parts 32b, 32c formed from the upper part of the main body part 32a and erected to have an arc-like shape so that the distance between the stop parts 32b, 32c decreases toward the tip thereof. The seven pairs of stop parts 32b, 32c are disposed in the circumferential direction of the retainer 32 at regular intervals. The stop parts 32b, 32c of each of the pairs have a ball pocket B, which has a roughly circular front view shape and rotatably holds the rolling element 33, formed inside thereof.

It should be noted that the number of the pairs of the stop parts, namely the number of the ball pockets B, is not limited to seven, but can also be not larger than six, or not smaller than 8.

The inner diameter of the retainer 32 is made larger than the outer diameter of the inner ring 30, and the outer diameter of the retainer 32 is made smaller than the inner diameter of the outer ring 31. In the state of installing the retainer 32 between the inner ring 30 and the outer ring 31, the rolling elements 33 are rotatably held by the ball pockets B, respectively. As described above, the rolling elements 33 are disposed between the inner ring rolling surface 30a of the inner ring 30 and the outer ring rolling surface 31a of the outer ring 31 in the state in which the inner ring 30 and the outer ring 31, and the retainer 32 do not interfere with each other.

The retainer 32 is arranged so as to be able to rotate around the central axis L2 in the state of rotatably holding the rolling elements 33 in the respective ball pockets B.

The material of the retainer 32 is not particularly limited, and there can be cited resin such as polyamide resin.

Between the pair of stop parts 32b, 32c in the upper part of the retainer 32 and the adjacent pair of stop parts 32b, 32c, there is formed a grease pocket G shallower in depth than the ball pockets B. In other words, the retainer 32 is provided with the ball pockets B and the grease pockets G alternately formed in the circumferential direction by the plurality of pairs of stop parts 32b, 32c.

As shown in FIG. 3 and FIG. 5, the grease 100 according to the invention is disposed in the grease pockets G, and the rolling elements 33 are disposed in the respective ball pockets B. As described above, in the invention, it is preferable for the grease to be kept in the parts other than the ball pockets on the retainer. When the rolling elements 33 rotate together with the retainer 32 in this state, the grease 100 seeps between the inner ring 30 and the outer ring 31, and the rolling elements 33 from the grease pockets G, and the lubrication effect due to the grease 100 can be obtained.

By using the grease 100 in the antifriction bearing 22 using the grease pockets G, it is possible to reduce an amount of the grease 100 used. Thus, the increase in torque of the antifriction bearing 22 due to excessive amount of the grease becomes apt to be suppressed, and the sufficient degree of cleanliness required for writing to the disks D becomes apt to be obtained.

The rolling elements 33 each have a spherical shape. The rolling elements 33 are arranged to be disposed in the respective ball pockets B of the retainer 32 between the inner ring rolling surface 30a of the inner ring 30 and the outer ring rolling surface 31a of the outer ring 31, and to roll and move along the inner ring rolling surface 30a and the outer ring rolling surface 31a. The rolling elements 33 are evenly arranged in the circumferential direction using the retainer 32.

The number of the rolling elements 33 is seven in this example, but it is sufficient to determine the number in accordance with the number of the ball pockets B in the retainer 32, and the number can also be not larger than six, or not smaller than eight. As the material of the rolling elements 33, there can be cited a metal material such as bearing steel.

The shield plates 34 are plate-like members each having a ring-like shape and respectively covering the upper side and the lower side of the annular space formed between the inner ring 30 and the outer ring 31. The shield plates 34 are installed above and below the retainer 32 and the plurality of rolling elements 33 between the inner ring 30 and the outer ring 31. Each of the shield plates 34 is fixed to the outer ring 31 in the state in which the outer circumferential edge part is fitted into an annular groove 40 provided for engagement to the outer ring 31.

(Operation Mechanism)

In the information recording/reproducing device 1, the grease 100 according to the invention is disposed in the grease pockets G of the retainer 32 in each of the antifriction bearings 22. When the swing arm 2 rotates due to the drive of the actuator 7, the grease 100 disposed in the grease pockets G is supplied between the inner ring 30 and the outer ring 31, and the rolling elements 33 passing through the side surfaces of the inner ring 30, the outer ring 31, and the retainer 32, and thus, the lubrication effect due to the grease 100 is exerted.

It should be noted that as the state of the grease supplied between the inner ring 30 and the outer ring 31, and the rolling elements 33 in which the lubrication effect can be obtained, there can be cited a state of the base oil including the additive agents seeped from the grease disposed in the grease pockets G, and a state in which a small amount of thickener is mixed with the base oil including the additive agents (including smaller amount of the thickener than the grease disposed in the grease pockets G) besides the grease (the mixture of the thickener, the base oil, and the additive agents) in substantially the same state as the grease disposed in the grease pockets G, and it is conceivable that there is a little chance of obtaining the state in which the grease in substantially the same state as the grease disposed in the grease pockets G is supplied.

In the information recording/reproducing device 1, since the grease according to the invention is used, an amount of the flying grease and an amount of the outgas are sufficiently reduced. Therefore, it is hard for the outgas to remain in the gap between the head-gimbal assemblies and the disks D and so on, and thus, reading and writing can stably be performed. The factors for making it possible to obtain such an advantage can be conceived as follows.

In the past, in general, the kinetic viscosity of the base oil is set to a low level for the purpose of preventing an amount of outgas from increasing due to a rise in temperature of the grease during the operation. The rolling elements proceed so as to push aside the grease supplied or the base oil seeped from the grease, and in this occasion, the grease flying as a mist and generation of the outgas are the most apt to occur. In the grease supplied, a rut parallel to the proceeding direction of the rolling element is formed immediately after the rolling element passes, and in the bearing device used in the information recording/reproducing device 1, bumps are formed at the both end parts of the reciprocation of the rolling element. However, if the kinetic viscosity of the base oil is low, or the consistency of the grease is high, the fluidity is high, and therefore, the rut and the bumps disappear before the adjacent rolling element passes, and the state in which the passing part of the rolling element is filled again with the grease or the base oil is apt to occur. Thus, since the rolling elements always proceed so as to push the grease or the base oil aside, it is conceivable that the flying of the grease or the base oil and the generation of the outgas become apt to occur.

In contrast, in the present invention, the kinetic viscosity of the base oil is set in a relatively high range of 40 through 90 mm$^2$/s. Further, the worked penetration is adjusted in a range of 200 through 250. Thus, there occurs the state in which the ruts and the bumps formed by the pass of the rolling elements remain to some extent when the adjacent rolling elements pass. Therefore, since an amount of the grease or the base oil pushed aside by the rolling elements is reduced, it is conceivable that the flying of the grease or the base oil and the generation of the outgas become hard to occur.

Due to the mechanism described above, the grease according to the invention exerts the advantage in particular as the grease used for the antifriction bearing of the type in which the grease, which has been applied (kept) only on the retainer so as not to be applied to the inner ring, the outer ring, and the rolling elements in the manufacturing stage of the antifriction bearing, gradually spreads to the rolling surfaces in the operation of the antifriction bearing to exert the lubrication effect. Therefore, it is sufficient for the grease to be kept in the parts other than the ball pockets on the retainer, and the application position of the grease is not limited to the grease pockets.

Further, there is a tendency that the more the mineral oil high in kinetic viscosity increases, the more the low-temperature characteristic degrades. However, in the grease according to the invention, since the PAO is more in mass than the mineral oil, and the PAO(A) higher in kinetic viscosity than the mineral oil is combined with the mineral oil, the grease according to the invention is superior in low-temperature characteristic even if the kinetic viscosity of the base oil is high.

Other Embodiments

It should be noted that it is sufficient for the antifriction bearing, the antifriction bearing device, and the information recording/reproducing device according to the invention to be those using the grease according to the invention, and the antifriction bearing, the antifriction bearing device, and the information recording/reproducing device according to the invention are not limited to those described above.

For example, although the information recording/reproducing device 1 equipped with the antifriction bearings 22 and the antifriction bearing device 6 is a device using the near-field light, a general HDD, an optical disk drive, and so on equipped with the antifriction bearing and the antifriction bearing device using the grease according to the invention can also be adopted.

Further, the antifriction bearing device can also be a device not provided with the sleeve. Specifically, it is possible to dispose an annular spacer ring for keeping the distance of each antifriction bearing to a predetermined distance between the two antifriction bearings disposed separately in the axial direction in the outside of the shaft to obtain the antifriction bearing not provided with the sleeve. In this case, it is possible to adopt a configuration in which the outer ring of the antifriction bearing is directly pressed into, or bond fitted into the attachment hole formed in the base part of the swing arm.

Further, the rolling elements in the antifriction bearing can also be skids each having a cylindrical shape.

SPECIFIC EXAMPLE

Although the invention will hereinafter be described in detail using some specific examples, the invention is not limited by the following descriptions.

[Kinetic Viscosity]

The kinetic viscosity of the mineral oil, the PAO, and the base oil was measured at 40° C. in conformity with JIS K2283 using Cannon-Fenske viscometer.

[Worked Penetration]

The worked penetration of the grease was measured using a method defined in JIS K2220. Firstly, the grease kept at 25° C. was mixed 60 times with a prescribed mixer. The pot of the mixer was filled with the fresh grease, then the grease was leveled by a spatula along the edge of the pot. Then, a prescribed conical cone was put on the grease, and then the length of sinking of the cone for 5 seconds due to the own weight was multiplied by 10 to thereby obtain the worked penetration.

[Raw Materials]

The raw materials used in the specific examples are as follows.

(Mineral Oil)

X-1: refined mineral oil (classified into group III in API base oil category; kinetic viscosity: 47 mm$^2$/s (40° C.); flash point: not lower than 240° C.)

X-2: refined mineral oil (classified into group II in API base oil category; kinetic viscosity: 52 mm$^2$/s (40° C.))

(PAO)

A-1: mixture of multimeric complex of α-olefin with carbon number 8 through 12; kinetic viscosity: 615 mm$^2$/s (40° C.)

B-1: multimeric complex of 1-decene; kinetic viscosity: 48 mm$^2$/s (40° C.)

B-2: mixture of multimeric complex of α-olefin with carbon number 8 through 12; kinetic viscosity: 30 mm$^2$/s (40° C.)

B-3: multimeric complex of 1-decene; kinetic viscosity: 52 mm$^2$/s (40° C.)

[Measurement of Aerosol Quantity]

As the evaluation of an amount of the flying grease and an amount of the outgas, the following aerosol quantity was measured.

In the grease pockets G of the antifriction bearing device 6 illustrated in FIGS. 3 through 6, the grease (2.1 through 2.7 mg) was disposed in total. The antifriction bearing device 6 was housed in an airtight container section of a jig. The antifriction bearing device 6 was made capable of performing the swing operation in this state. The airtight container section was provided with two holes disposed at two places located in the rotational axis line direction of the antifriction bearing device 6, and air was fed into the antifriction bearing device 6 through one of the holes, and a particle counter was provided to the other of the holes. In this state, the antifriction bearing device 6 was made to perform the swing operation in 10 degrees at 50 Hz for 10 minutes, and then, the aerosol quantity was measured.

[Low-Temperature Torque Test]

The low-temperature torque test was conducted at 0° C. and −30° C. in conformity with JIS K2220 (Low Temperature Torque Test; bearing: 6204), and the starting torque (initial torque) and the rotary torque as the torque stabled after starting up were measured, respectively.

[Base Oil Pour Point]

The test tube containing the base oil was preliminarily heated up to 46° C., and then cooled. The measurement was started at a temperature 10° C. higher than the expected pour point. Every time the temperature dropped by 2.5° C., the test tube was taken out from the cooling bath, and then laid to perform the measurement. In the case in which the base oil did not move for five seconds, the temperature in the previous measurement, namely the temperature 2.5° C. higher than the temperature at which the base oil did not move was measured as the base oil pour point (° C.).

[Abrasion Resistance Test]

As the abrasion resistance test, the four-ball extreme-pressure test and the Fafnir test were conducted.

Specifically, the four-ball extreme-pressure test was compliant with ASTM D2266, and three steel balls were fixed in the state of having contact with each other, and then the grease was applied on the three steel balls. A rotating steel ball was further pressurized to the center of the three steel balls with the weight of 392 N. In this state, the atmospheric temperature was set to 75° C., and the rotating steel ball was rotated at 1200 rpm for one hour. Subsequently, the diameter of each of the wear marks of the three fixed steel balls was measured in a vertical direction and a horizontal direction, then the six diameter values were averaged, and then rounded off to two decimal places (i.e., 0.01 mm).

The Fafnir test (fretting test) is compliant with ASTM D4170. Two pairs of thrust bearings were prepared, and the weight of each of the four orbital boards was measured in advance. The preload of 2450 N was applied to the two pairs of thrust bearings having the orbital boards and the rolling elements filled with the grease, and the swing operation in 12 degrees at 30 Hz was performed at a room temperature for 22 hours. After the test, the weight of each of the four orbital boards with the grease wiped out was measured to obtain the weight loss. The weight loss values were averaged, and then rounded off to one decimal place (i.e., 0.1 mg) to obtain the result.

First Specific Example

The mineral oil (X-1), the PAO (A-1), and the PAO (B-1) were mixed so that the mass ratio between the mineral oil and the PAO was 3:7 to obtain the base oil (the kinetic viscosity $\nu=72$ mm$^2$/s (40° C.)). The PAO (A-1) and the PAO (B-1) were mixed so that the kinetic viscosity $\nu_2$ of the PAO became 86 mm$^2$/s (40° C.)

Then, the grease was made using the base oil and the alicyclic diurea compound as the thickener, and then the antioxidant, the rust inhibitor, and the extreme-pressure agent were added and mixed. Regarding the proportions of the respective components to the gross mass (100 mass %) of the grease, the base oil was 86.0 mass %, the thickener was 12.5 mass %, the antioxidant was 0.5 mass %, the rust inhibitor was 1.0 mass %, and the extreme-pressure agent was 1.0 mass %.

Second Specific Example

The grease was made in substantially the same manner as in the first specific example except for changing the composition of the base oil as shown in Table 1 while fixing the mass ratio between the mineral oil and the PAO to 3:7 to adjust the kinetic viscosity $\nu_1$ of the mineral oil, the kinetic viscosity $\nu_2$ of the PAO, and the kinetic viscosity $\nu$ of the base oil.

First Through Third Comparative Examples

The composition of the base oil was changed as shown in Table 1 while setting the mass ratio between the mineral oil and the PAO to 1:1 without using the PAO (A-1) to adjust the kinetic viscosity $\nu_1$ of the mineral oil, the kinetic viscosity $\nu_2$ of the PAO, and the kinetic viscosity $\nu$ of the base oil. Further, the grease was made in substantially the same manner as in the first specific example except for skipping adding the extreme-pressure agent.

The evaluation result of the examples is shown in Table 1. The aerosol quantity in Table 1 is described with relative value assuming that the aerosol quantity in the first comparative example is "100."

TABLE 1

| | | FIRST SPECIFIC EXAMPLE | SECOND SPECIFIC EXAMPLE | FIRST COMPARATIVE EXAMPLE | SECOND COMPARATIVE EXAMPLE | THIRD COMPARATIVE EXAMPLE |
|---|---|---|---|---|---|---|
| MINERAL OIL | TYPE | X-1 | X-1 | X-2 | X-1 | X-1 |
| | KINETIC VISCOSITY $\nu_1$[mm$^2$/s] | 47 | 47 | 52 | 47 | 47 |
| PAO(A) | TYPE | A-1 | A-1 | — | — | — |
| | KINETIC VISCOSITY $\nu_A$[mm$^2$/s] | 615 | 615 | — | — | — |
| PAO(B) | TYPE | B-1 | B-2 | B-3 | B-2 | B-1 |
| | KINETIC VISCOSITY $\nu_B$[mm$^2$/s] | 48 | 30 | 52 | 30 | 48 |
| KINETIC VISCOSITY $\nu_2$ OF PAO [mm$^2$/s] | | 86 | 82 | 52 | 30 | 48 |
| KINETIC VISCOSITY $\nu$ OF BASE OIL [mm$^2$/s] | | 72 | 69 | 52 | 35 | 48 |
| $\nu_1/\nu_2$ | | 0.55 | 0.57 | 1.00 | 1.57 | 1.02 |
| AEROSOL QUANTITY | | 21 | 19 | 100 | 36 | 41 |
| LOW-TEMPERATURE TORQUE [mN · m] | 0° C. STARTING TORQUE | 68 | 51 | 98 | 55 | 61 |
| | ROTARY TORQUE | 34 | 25 | 37 | 27 | 29 |
| | −30° C. STARTING TORQUE | 194 | 153 | 473 | 133 | 179 |
| | ROTARY TORQUE | 39 | 32 | 80 | 33 | 34 |
| BASE OIL POUR POINT[° C.] | | −37.5 | −40 | −20 | −42.5 | −40 |
| ABRASION RESISTANCE TEST | FOUR-BALL EXTREME-PRESSURE TEST | 0.58 | 0.67 | 0.99 | 0.60 | 0.57 |
| | FAFNIR TEST | 3.6 | 1.0 | 4.3 | 0.7 | 3.8 |
| WORKED PENETRATION | | 215 | 232 | 222 | 221 | 216 |

As shown in Table 1, in the first specific example and the second specific example in which the mass of the PAO was higher than the mass of the mineral oil, the PAO(A) was included, and the kinetic viscosity of the base oil was in a range of 40 through 90 mm2/s, the aerosol quantity was small, and an amount of the flying grease and an amount of the outgas were reduced. Further, in the first and second specific examples, the low-temperature torque was low, the base oil pour point was also low, and the grease was superior in low-temperature characteristic. Further, the grease in the first and second specific examples exerted a sufficient effect as the grease also in the abrasion resistance test.

In contrast, in the first through third comparative examples in which the PAO (A) was not used, the aerosol quantity was high, and the reduction of an amount of the flying grease and an amount of the outgas was insufficient.

What is claimed is:
1. A grease comprising:
    a base oil; and
    a thickener,
    wherein the base oil includes mineral oil having a kinetic viscosity at 40° C. in a range of 40 to 80 mm$^2$/s and poly-α-olefin, an amount of the poly-α-olefin by mass in the base oil is greater than an amount of the mineral oil by mass in the base oil, the proportion of total mass of the mineral oil and the poly-α-olefin to gross mass of the base oil is equal to or higher than 90 mass %;

the poly-α-olefin includes poly-α-olefin (A) which has a kinetic viscosity higher than the kinetic viscosity of the mineral oil and poly-α-olefin (B) which has a kinetic viscosity equal to or lower than the kinetic viscosity of the mineral oil, the kinetic viscosity of the poly-α-olefin at 40° C. is in a range of 40 through 90 mm$^2$/s, and worked penetration is in a range of 200 through 250.

2. The grease according to claim 1, wherein a proportion of the mass of the mineral oil to a gross mass of the base oil is in a range of 10 through 40 mass %.

3. The grease according to claim 2, wherein the mineral oil includes refined oil classified into group III in a base oil category defined by American Petroleum Institute.

4. The grease according to claim 1, wherein the mineral oil includes refined oil classified into group III in a base oil category defined by American Petroleum Institute.

5. The grease according to claim 1, wherein the poly-α-olefin higher in kinetic viscosity than the mineral oil includes a mixture of a multimeric complex of α-olefin with a carbon number in a range of 8 through 12.

6. An antifriction bearing comprising: the grease according to claim 1.

7. The antifriction bearing according to claim 6 further comprising:

a retainer having a ball pocket in which a rolling element is disposed, wherein the grease is kept in a part other than the ball pocket on the retainer.

8. An antifriction bearing device comprising:

a shaft; and the antifriction bearing according claim 7.

9. An antifriction bearing device comprising:

a shaft; and the antifriction bearing according claim 6.

10. An information recording/reproducing device comprising:

the antifriction bearing device according to claim 8.

* * * * *